Dec. 26, 1933.  J. J. FERLIN ET AL  1,940,999
VALVE
Filed Dec. 16, 1929
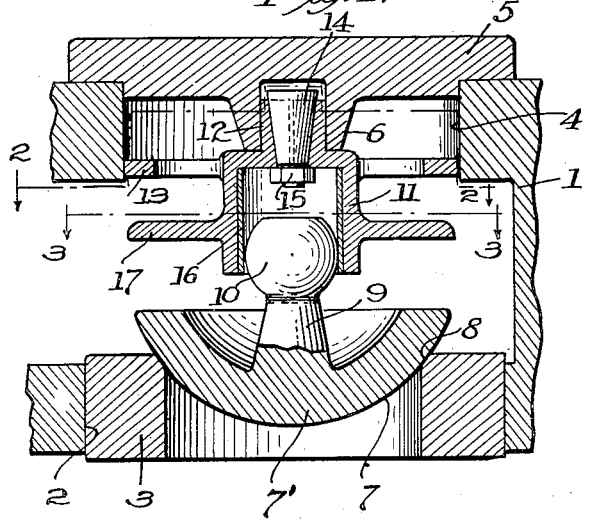
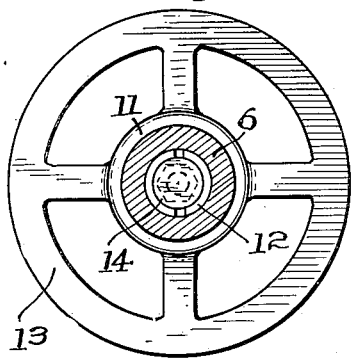
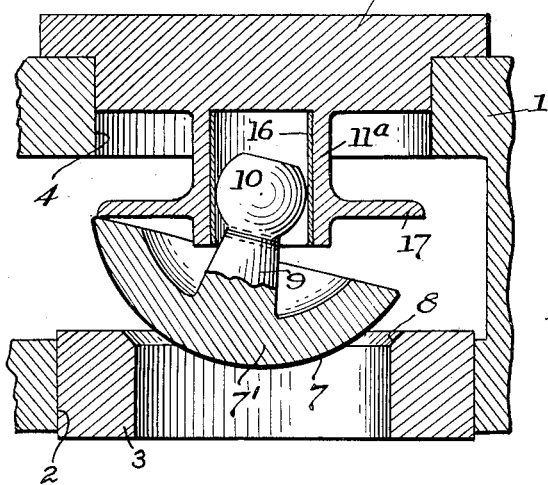
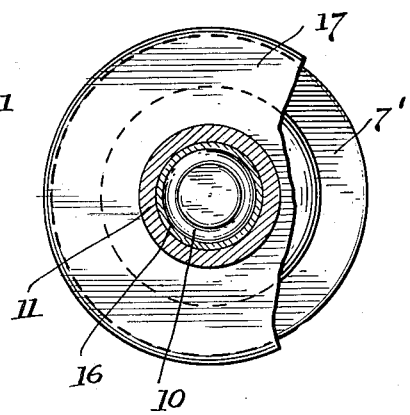
INVENTORS.
John J. Ferlin,
Herbert W. Goetz,
BY
R. W. Smith
ATTORNEY.

Patented Dec. 26, 1933

1,940,999

UNITED STATES PATENT OFFICE 1,940,999

VALVE

John J. Ferlin, Los Angeles, and Herbert W. Goetz, Alhambra, Calif.

Application December 16, 1929
Serial No. 414,310

8 Claims. (Cl. 251—127)

This invention is a poppet valve particularly adapted for use in slush pumps and having an arcuate seating surface cooperating with a valve seat so that the valve in addition to normal opening and closing movement is adapted to oscillate so as to shift the area of contacting engagement between the valve and its seat; and it is the object of the invention to so mount the valve as to insure oscillation thereof concentric with its arcuate seating surface in order to uniformly circumferentially distribute the impact incident to closing of the valve.

More particularly it is an object of the invention to provide a valve having a head which is a segment of a sphere adapted to engage a cooperating concentrically curved surface of the valve seat, with an arcuate guide bearing adapted to guide opening and closing movement of the valve and providing for its relative circumferential shifting, and the surface of the arcuate bearing being concentric with the arcuate seating surface of the valve so as to uniformly circumferentially distribute the seating impact irrespective of the oscillation of the valve.

It is a further object of the invention to provide a guide sleeve for the arcuate bearing which is adapted for ready mounting in a pump structure of standard construction, the guide sleeve and the usual bonnet for the valve chest being formed as an integral structure, or the guide sleeve comprising a separate structure adapted for attachment to a standard bonnet.

It is a further object of the invention to provide a construction wherein the arcuate surface of the guide bearing while concentric with the arcuate contacting surface of the valve, is of appreciably shorter radius, so that the guide bearing and its cooperating guide sleeve may be of such restricted size with relation to the valve and its seat, as not to unduly restrict the fluid passageway which communicates with the valve seat.

It is a further object of the invention to provide for axially alining the guide sleeve with the valve seat, and to preferably provide the guide sleeve with means adapted for impingement by the open valve for limiting its oscillatory movement.

Further objects of the invention will be readily understood from the following description of the accompanying drawing, in which:

Fig. 1 is an axial section through the valve, showing it in closed position.

Fig. 2 is a transverse section on the line 2—2 of Fig. 1.

Fig. 3 is a transverse section on the line 3—3 of Fig. 1.

Fig. 4 is an axial section through the valve in open position and showing a modification of its guide sleeve.

For purpose of illustration I have shown the valve employed in a usual slush pump having valve chest 1 provided with port 2 for a valve seat 3, and having opening 4 in alinement with port 2, with said opening closed by a usual bonnet 5 having a depending valve stem guide 6 as shown in Figs. 1 and 2, or closed by a specially constructed bonnet 5a as shown in Fig. 4.

The valve, which has an arcuate contacting surface and is adapted for oscillation relative to its seat which has a corresponding arcuate contacting surface, is guided so that said oscillating movement is always concentric with the arcuate contacting surface of the valve, thereby preventing striking of one side of the valve in advance of the other as the valve is moved to closed position; and the means for thus guiding the valve is so constructed as to avoid unduly obstructing the valve chest 1.

As an instance of this arrangement the valve head 7' is a minor segment of a hollow sphere, with its outer curved surface 7 adapted to seat on an annular curved surface 8 of the seat 3, the curved surfaces 7—8 having the same radius and being concentric when the valve is closed; and a stem 9 of appreciably restricted diameter, which may be integral with the valve head, projects upwardly therefrom and is formed with a bearing surface 10, shown as the surface of a segment of a sphere, which is concentric with but of appreciably shorter radius than the arcuate surface 7 and is slidably journaled in a cooperating guide sleeve which depends from the bonnet of the valve chest.

The guide sleeve, shown at 11 in Figs. 1 and 2, is adapted for attachment to usual bonnet 5, and for this purpose is formed at its upper end with a split collar 12 adapted for reception in the usual depending valve stem guide 6 of the bonnet, while in the construction shown in Fig. 4 the bonnet 5a is formed without a usual depending valve stem guide and in lieu thereof has the depending guide sleeve 11a formed integral therewith.

The guide sleeve 11 is adapted for exact axial alinement with the valve seat 3, and for this purpose may have a radially projecting guiding annulus 13 adapted for snug fit in the opening 4 of the valve chest, with the collar 12 adapted to be securely clamped in the bore of guide 6, as for example by a wedging mandrel 14 which is tightened by nut 15 so as to expand the split collar 12 and bind the same in the bore of the guide irrespective of any slight eccentricity of the bore such as may have resulted from excessive wear; and in the construction shown in Fig. 4 the guide sleeve 11a is adapted for exact axial alinement with the valve seat 3 as a result of mounting the bonnet 5a in operative position projecting into the opening 4 which is in exact alinement with the valve seat.

The guide sleeve, when constructed either as shown in Fig. 1 or Fig. 4, is preferably provided with a wear-resisting bushing 16 in which bearing 10 is adapted to slide for opening and closing movement of the valve, and in which the bearing is adapted to revolve for arcuate shifting of the valve relative to its seat; and said arcuate shifting of the valve may be limited by a flange 17 projecting radially from the guide sleeve and adapted for abutment by the open valve as shown in Fig. 4. The valve may be yieldably urged to closed position by any suitable means, and in the present instance is adapted to close simply by the weight of the valve and open in usual manner responsive to pressure.

The valve is thus free for limited universal shifting with relation to its seat so as to distribute wear while maintaining a tight seating engagement, and by forming the bearing 10 concentric with the surface 7 the valve is restricted to oscillations concentric with said surface so that when the valve closes the impact will be uniformly distributed circumferentially of the valve and its cooperating seat; and the invention provides for thus guiding oscillatory movement of the valve without unduly obstructing the valve chest, and also provides for either incorporating the improved valve in a standard pump structure by adapting the guide sleeve 11 for suspension from a usual bonnet 5, or manufacturing the valve as a part of a pump structure by forming the guide sleeves 11a integral with the bonnet 5a.

We claim:

1. In combination, a valve, a valve seat, the valve and seat having cooperating arcuate contacting surfaces of the same radius and concentric when the valve is closed, a stem for the valve, a guide sleeve, and a bearing surface on the valve stem concentric with the arcuate contacting surface of the valve and adapted to slide axially in the guide sleeve for opening and closing movement of the valve, and also adapted for turning movement in the guide sleeve so that the valve is adapted for shifting circumferentially of said arcuate contacting surfaces while maintaining relative positioning of said surfaces insuring their snug seating engagement.

2. In combination, a valve having an arcuate contacting surface, a valve stem fixed to the valve, a guide sleeve, and a bearing surface on the valve stem concentric with the arcuate contacting surface of the valve and adapted to slide longitudinally and rotate in the guide sleeve so that the valve is adapted for shifting circumferentially of its arcuate contacting surface but is restricted in said circumferential shifting to movement concentric with the arcuate contacting surface of the valve.

3. In combination, a valve having a contacting surface comprising a segment of a sphere, a valve stem fixed to the valve, a guide sleeve, and a spherical bearing on the valve stem concentric with the spherical contacting surface of the valve and adapted to slide longitudinally and revolve in the guide sleeve so that the valve is adapted for universal revolution but is restricted in said revolution to movement concentric with the spherical contacting surface of the valve.

4. In combination, a valve chest, a valve seat, the valve chest having an opening in alinement with the valve seat, a bonnet for said opening, a valve having an arcuate contacting surface, a valve stem fixed to the valve, a guide sleeve depending from the bonnet in axial alinement with the valve seat, and a bearing surface on the valve stem concentric with the arcuate contacting surface of the valve and adapted to slide longitudinally and rotate in the guide sleeve so that the valve is adapted for shifting circumferentially of its arcuate contacting surface but is restricted in said circumferential shifting to movement concentric with the arcuate contacting surface of the valve.

5. In combination, a valve chest, a valve seat, the valve chest having an opening in alinement with the valve seat, a bonnet for said opening, a valve having an arcuate contacting surface, a valve stem fixed to the valve, a guide sleeve depending from the bonnet, a flange on the guide sleeve adapted for reception in the valve chest opening for axially alining the guide sleeve with the valve seat, and a bearing surface on the valve stem concentric with the arcuate contacting surface of the valve and adapted to slide longitudinally and rotate in the guide sleeve so that the valve is adapted for shifting circumferentially of its arcuate contacting surface but is restricted in said circumferential shifting to movement concentric with the arcuate contacting surface of the valve.

6. In combination, a valve chest, a valve seat, the valve chest having an opening in alinement with the valve seat, a bonnet for said opening having a depending valve stem guide, a valve having an arcuate contacting surface, a valve stem fixed to the valve, a guide sleeve adapted for suspension from the valve stem guide, and a bearing surface on the valve stem concentric with the arcuate contacting surface of the valve and adapted to slide longitudinally and rotate in the guide sleeve so that the valve is adapted for shifting circumferentially of its arcuate contacting surface but is restricted in said circumferential shifting to movement concentric with the arcuate contacting surface of the valve.

7. In combination, a valve chest, a valve seat, the valve chest having an opening in alinement with the valve seat, a bonnet for said opening having a depending valve stem guide, a valve having an arcuate contacting surface, a valve stem fixed to the valve, a guide sleeve having a split collar adapted for wedging reception in the valve stem guide for suspending the guide sleeve therefrom, and a bearing surface on the valve stem concentric with the arcuate contacting surface of the valve and adapted to slide longitudinally and rotate in the guide sleeve so that the valve is adapted for shifting circumferentially of its arcuate contacting surface but is restricted in said circumferential shifting to movement concentric with the arcuate contacting surface of the valve.

8. In combination, a valve having an arcuate contacting surface, a valve stem fixed to the valve, a guide sleeve, a bearing surface on the valve stem concentric with the arcuate contacting surface of the valve and adapted to slide longitudinally and rotate in the guide sleeve so that the valve is adapted for shifting circumferentially of its arcuate contacting surface but is restricted in said circumferential shifting to movement concentric with the arcuate contacting surface of the valve, and means for limiting said circumferential shifting of the valve.

JOHN J. FERLIN.
HERBERT W. GOETZ.